(12) United States Patent
Shaheen

(10) Patent No.: US 9,185,673 B2
(45) Date of Patent: Nov. 10, 2015

(54) MACHINE TYPE COMMUNICATION PREREGISTRATION

(75) Inventor: Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 601 days.

(21) Appl. No.: 12/954,138

(22) Filed: Nov. 24, 2010

(65) Prior Publication Data

US 2011/0134841 A1    Jun. 9, 2011

Related U.S. Application Data

(60) Provisional application No. 61/264,531, filed on Nov. 25, 2009.

(51) Int. Cl.
*H04W 4/00*   (2009.01)
*H04W 60/04*  (2009.01)
*H04L 29/08*  (2006.01)

(52) U.S. Cl.
CPC .............. *H04W 60/04* (2013.01); *H04L 67/12* (2013.01); *H04L 67/125* (2013.01); *H04W 4/00* (2013.01); *H04W 4/005* (2013.01)

(58) Field of Classification Search
CPC .............. H04L 12/185; H04L 12/2856; H04L 12/2898; H04L 67/125; H04W 72/005; H04W 4/08; H04W 4/00; H04W 4/005; H04W 60/04
USPC ...................... 370/328; 455/433, 435.1, 435.2
See application file for complete search history.

(56) References Cited

U.S. PATENT DOCUMENTS

| 7,765,289 | B2 |   | 7/2010 | Park |        |
|-----------|----|---|--------|------|--------|
| 2005/0075107 | A1 | * | 4/2005 | Wang et al. | 455/435.1 |
| 2005/0201304 | A1 | * | 9/2005 | Olshansky | 370/282 |
| 2006/0023733 | A1 | * | 2/2006 | Shimizu et al. | 370/432 |
| 2006/0120287 | A1 | * | 6/2006 | Foti et al. | 370/231 |

(Continued)

FOREIGN PATENT DOCUMENTS

| CN | 101087209 A | 12/2007 |
|----|-------------|---------|
| CN | 201048457 Y | 4/2008  |

(Continued)

OTHER PUBLICATIONS

Mouly et al., "The Basic Procedures," GSM System for Mobile Communications, pp. 466-477 (Jan. 1993).

(Continued)

*Primary Examiner* — Hoang-Chuong Vu
(74) *Attorney, Agent, or Firm* — Condo Roccia Koptiw LLP

(57) ABSTRACT

A method and apparatus for machine type communication (MTC) preregistration are provided. The methods provide single or periodic preregistrations and may be machine to machine (M2M) application function (AF) or device (MTC user equipment based). The devices in the system may be divided into groups and accessed by on a group Internet Protocol (IP) address. Two wake up cycles may be provided, one for control and one for uploading information (a reporting cycle). During the control cycle, the devices may wake up and listen to the control channel for any paging messages. Depending on the paging information, individual devices or the entire group may access the system. In the reporting cycle, all the devices may wake up and access the system to connect to the M2M system to upload data.

14 Claims, 13 Drawing Sheets

(56) References Cited

U.S. PATENT DOCUMENTS

| | | |
|---|---|---|
| 2007/0207806 A1 | 9/2007 | Shaheen |
| 2007/0263577 A1* | 11/2007 | Gallo et al. ............... 370/338 |
| 2008/0120369 A1* | 5/2008 | Gustavsson ............... 709/204 |
| 2008/0181188 A1* | 7/2008 | Aghvami et al. ............ 370/338 |
| 2008/0259876 A1* | 10/2008 | Qiang et al. ............... 370/332 |
| 2009/0059842 A1* | 3/2009 | Maltseff et al. ............ 370/328 |
| 2009/0068996 A1* | 3/2009 | Bakker et al. ............ 455/414.1 |
| 2009/0113027 A1* | 4/2009 | Gomyo et al. ............. 709/220 |
| 2009/0207805 A1* | 8/2009 | Zou ........................... 370/331 |
| 2009/0210075 A1 | 8/2009 | Moriwaki |
| 2009/0238349 A1* | 9/2009 | Pezzutti ................... 379/93.02 |
| 2010/0075680 A1* | 3/2010 | Ramachandran et al. .... 455/436 |
| 2010/0313261 A1* | 12/2010 | Park ........................... 726/11 |
| 2011/0021215 A1 | 1/2011 | Iwamura et al. |
| 2011/0080091 A1* | 4/2011 | Staab et al. ................. 315/61 |
| 2012/0213185 A1* | 8/2012 | Frid ........................... 370/329 |

FOREIGN PATENT DOCUMENTS

| | | |
|---|---|---|
| CN | 101370252 A | 2/2009 |
| CN | 101803435 A | 8/2010 |
| EP | 2 104 379 | 9/2009 |
| EP | 2200351 A1 | 6/2010 |
| JP | 2009094896 A | 4/2009 |
| JP | 4580423 B2 | 11/2010 |
| JP | 4685958 B2 | 5/2011 |
| KR | 20100071992 A | 6/2010 |
| WO | WO 2006090480 A1 | 8/2006 |
| WO | 2009/022834 | 2/2009 |
| WO | WO 2009/024067 A1 | 2/2009 |
| WO | WO 2009035060 A1 | 3/2009 |

OTHER PUBLICATIONS

3rd Generation Partnership Project (3GPP), S1-094154, "Contribution to TS 22.368: Proposed Group Specific MTC Devices Trigger Use Case in Annex A and Proposed Requirement for the Group Based Category in Section 7.2.6", TSG-SA WG1 Meeting #48, Beijing, China, Nov. 16-20, 2009, 1 page.

3rd Generation Partnership Project (3GPP), TS 22.368 V1.0.0, "Technical Specification Group Services and System Aspects, Service Requirements for Machine-Type Communications, Stage 1 (Release 10)", Aug. 2009, 22 pages.

* cited by examiner

US 9,185,673 B2

MACHINE TYPE COMMUNICATION PREREGISTRATION

CROSS REFERENCE TO RELATED APPLICATIONS

This application claims the benefit of U.S. provisional application No. 61/264,531 filed Nov. 25, 2009, the contents of which are hereby incorporated by reference herein.

TECHNICAL FIELD

This disclosed subject matter relates to wireless communications.

BACKGROUND

Machine to Machine (M2M) communication, such as machine-type communications (MTC), may include data communication between entities that do not necessarily include human interaction. Accordingly, a method and apparatus for machine-type communication preregistration would be advantageous.

SUMMARY

A method and apparatus for machine type communication (MTC) preregistration are provided. The methods provide single or periodic preregistrations and may be machine to machine (M2M) application function (AF) or device (MTC user equipment based). The devices in the system may be divided into groups and accessed by on a group Internet Protocol (IP) address. Two wake up cycles may be provided, one for control and one for uploading information (a reporting cycle). During the control cycle, the devices may wake up and listen to the control channel for any paging messages. Depending on the paging information, individual devices or the entire group may access the system. In the reporting cycle, all the devices may wake up and access the system to connect to the M2M system to upload data.

BRIEF DESCRIPTION OF THE DRAWINGS

A more detailed understanding may be had from the following description, given by way of example in conjunction with the accompanying drawings wherein.

DETAILED DESCRIPTION

Figure 1A:
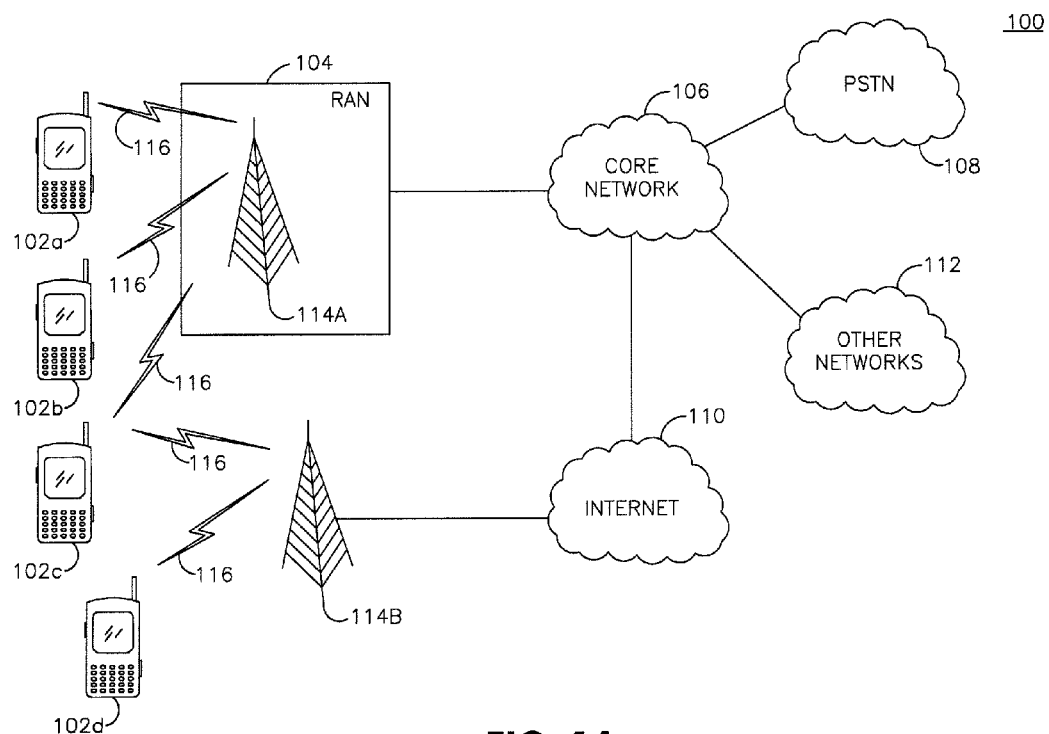
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a machine-type communication (MTC) device and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
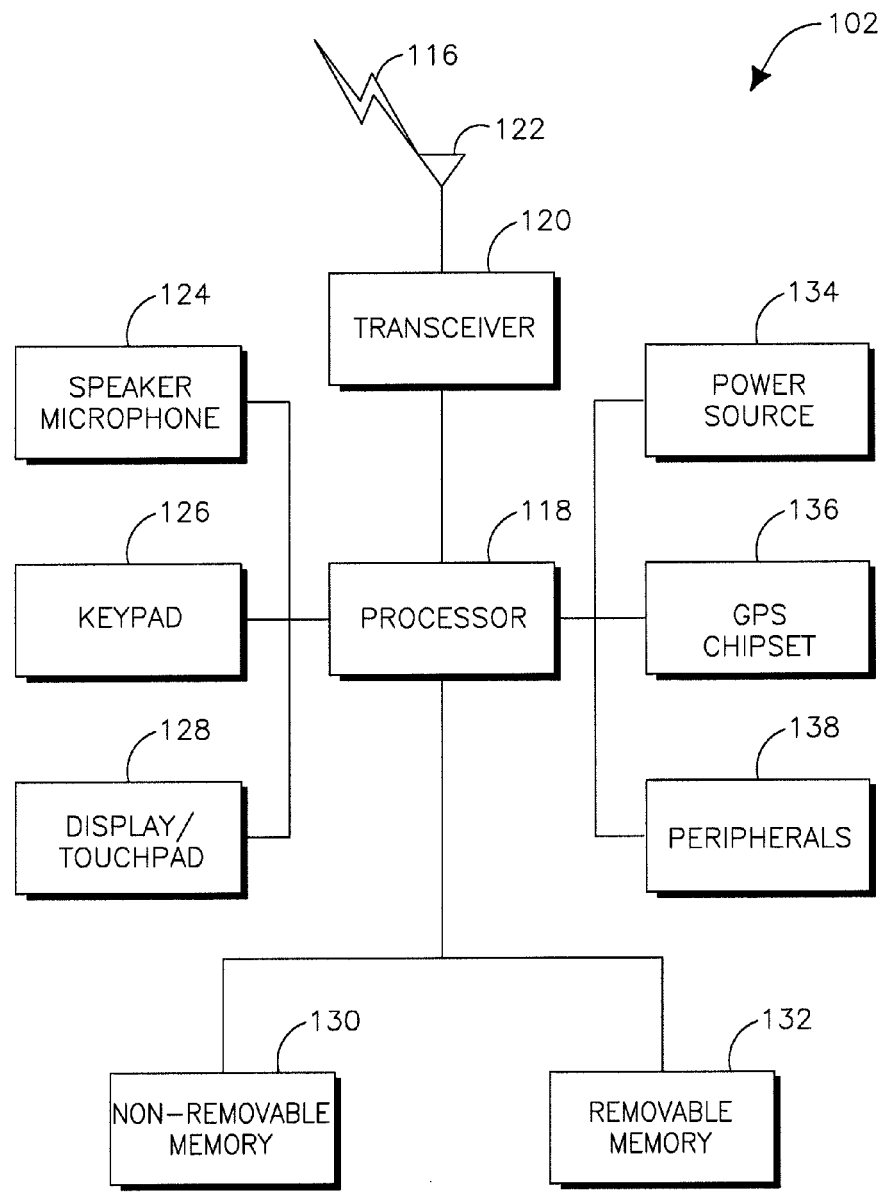
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
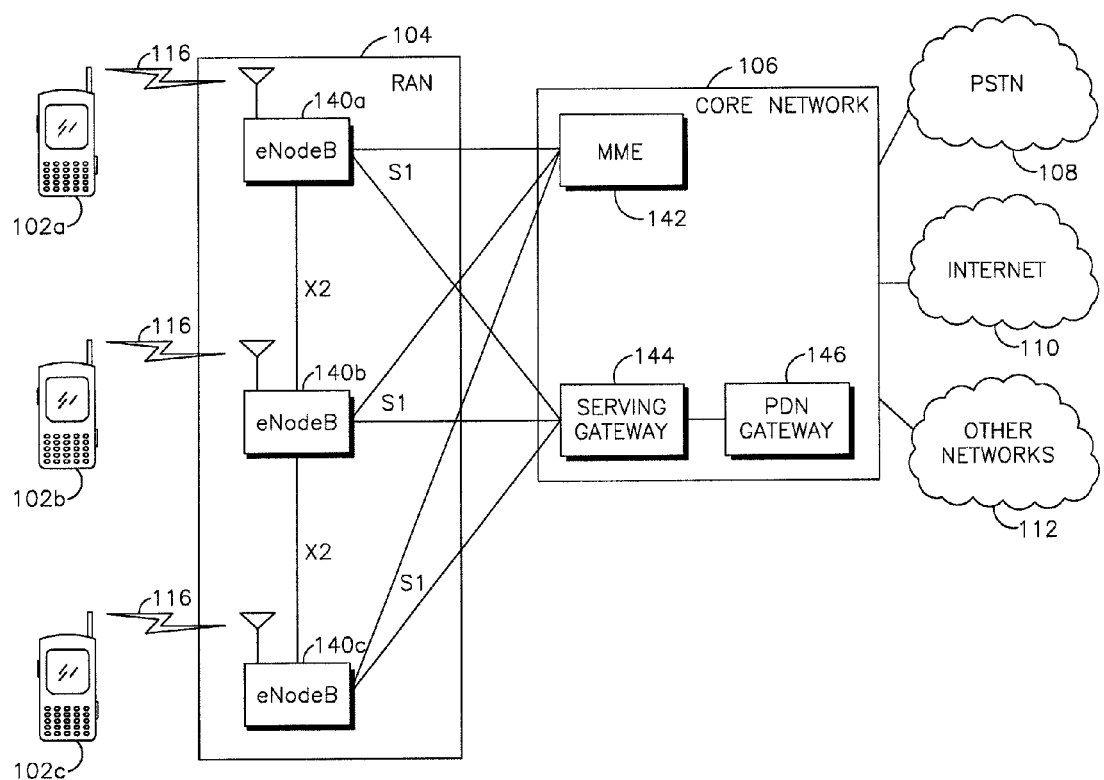
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Machine to Machine (M2M) communication, (also referred to as "machine-type communications" or "MTC"), may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communication may be used to implement PAYD systems in the area of car insurance. For example, an insurance company may charge a driver of a car based on the usage of the car, instead of on a fixed premium. To accomplish this, the car is equipped with a M2M wireless transmit/receive unit (WTRU), a GPS device, and various other sensors that transmit the data to the insurance company. The M2M WTRU may include a Universal Integrated Circuit Card (UICC). The insurance company may set the rate charged to the driver based on the received data. The insurance company may have a contract with the operator of the wireless network by which the M2M WTRU communicates, to allow the WTRU to use the operator's network.

In the area of tracking and tracing, a car rental company may equip a car with a M2M WTRU to obtain information about the location of the car as it is driven. In the building industry, for example, M2M WTRUs may be used to keep track of expensive tools or other equipment. In the oil industry, M2M WTRUs may be used to keep track of containers.

Many metering devices remain largely untouched after their installation. In some industries, for example, an installed meter may remain untouched for eight or more years after installation. In such a circumstance, the IUCCs in the M2M WTRUs need to be protected. If this is not properly accomplished, it may be possible for the connection to the utility to be cut, thereby facilitating fraud. Additionally, if the utility and/or the operator of the wireless network by which the M2M WTRU communications change, problems may occur. For example, if the utility customer changes their utility supplier from one company to another, the new utility supplier may not have a contract with the same network operator as the original utility supplier. This circumstance may be addressed by complex accounting mechanisms, or the new utility company may need to send out a service person to install a new M2M WTRU or configure the installed M2M WTRU. However, both of these approaches are costly and error-prone.

Depending on its implementation, M2M communication may be different from some current communication models. For example, M2M communication may involve new or different market scenarios. M2M communications may also differ from some current technologies in that M2M communication may involve a large number of WTRUs, and/or may involve very little traffic per WTRU. Additionally, relative to some current technologies, M2M communication may involve lower costs and less effort to deploy.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M WTRUs. Additionally, further enhancements to these technologies may provide additional opportunities for the deployment of M2M-based solutions. Table 1 summarizes the above described implementations for MTC applications.

TABLE 1

| Service Area | MTC applications |
|---|---|
| Security | Surveillance systems |
|  | Backup for landline |
|  | Control of physical access (e.g. to buildings) |
|  | Car/driver security |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/ Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Figure 2:
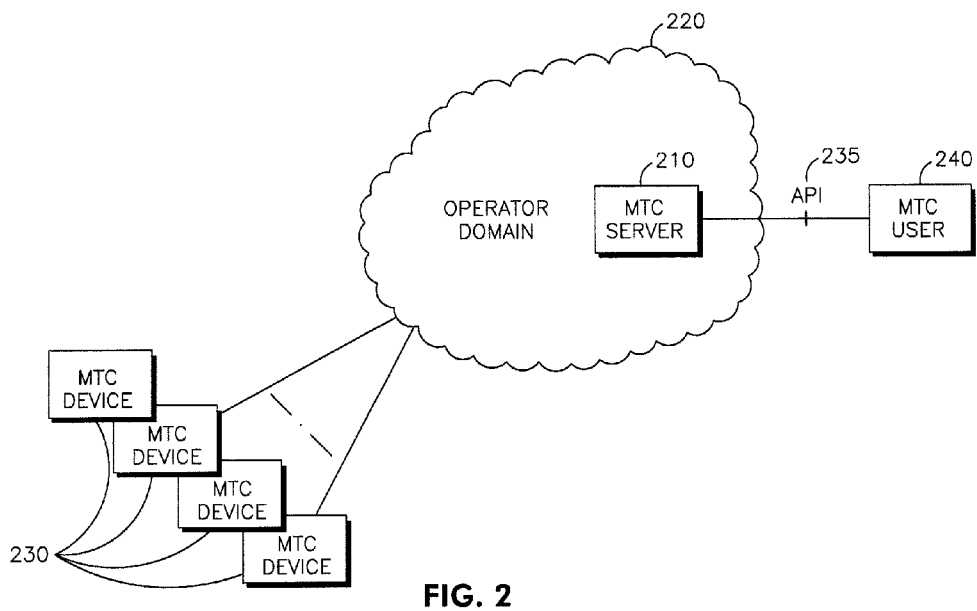
FIG. 2 is an example machine-type communication (MTC) with an MTC server within the operator domain.
Figure 3:
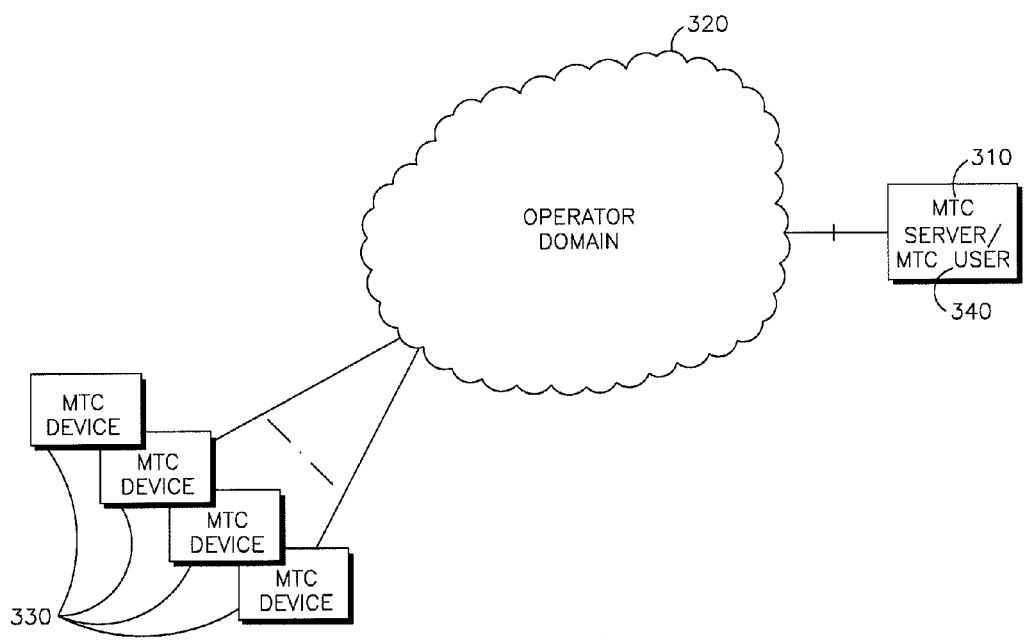
FIG. 3 is an example MTC with an MTC server outside of the operator domain.
Figure 4:
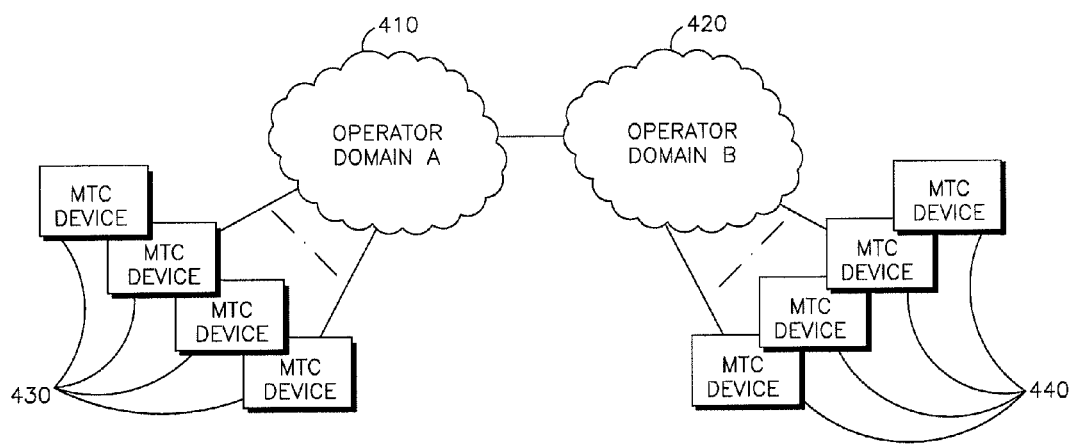
FIG. 4 is an example MTC without an MTC server.

FIGS. 2-4 show different example architectures for MTC applications. FIG. 2 shows an example MTC architecture 200 that includes an MTC server 210 inside an operator domain 220. A group of MTC devices (WTRUs) 230 may communicate with the MTC server 210. The MTC server 210 may communicate with the public land mobile network (PLMN) and to MTC devices 230 via the PLMN. The MTC server 210 may communicate via an application programming interface (API) 235 with an MTC user 240 and may perform services for the MTC user 240. Each MTC device 230 may be a WTRU equipped for machine-type communication.

FIG. 3 shows an example MTC architecture 300 that includes an MTC server 310 located outside of an operator domain 320. A group of MTC devices (WTRUs) 330 may communicate with the MTC server 310. The MTC server 310 may be coupled to an MTC user 340. The group of MTC devices 330 may communicate through an operator domain 320, which may communicate with the MTC server 310.

FIG. 4 shows an example MTC architecture 400 wherein MTC devices (WTRUs) may communicate directly without an intermediate MTC server. A first group of MTC devices 430 may communicate through an operator domain A 410. A second group of MTC devices 440 may communicate through operator domain B 420. Operator domain A 410 and operator domain B 420 may communicate with each other, which enables the first group of MTC devices 430 to communicate with the second group of MTC devices 440 via their respective operator domains, (operator domain A 410 and operator domain B 420 without an intermediate MTC server.

An M2M application function (AF) may perform preregistration, de-registration, Internet Protocol (IP) activation, IP de-activation, on behalf of an MTC WTRU in the network. The M2M AF may be found in a network element. Alternatively, the M2M AF may be a stand alone device in a communications network. An example M2M AF includes one or more transmitters and receivers to communicate with one or more WTRUs or other elements in the communications network.

Proximal MTC WTRUs, such as MTC WTRUs in a cell or geographic area, may use group based identification, such as International Mobile Subscriber Identity (IMSI) or Packet-Temporary Mobile Subscriber Identity (P-TMSI), for network access. In addition, a wake up cycle for an AF and an MTC WTRU may be synchronized, for example, where the AF and the MTC WTRU are associated with different groups. The MTC WTRUs in the same group may be synchronized to wake up at certain time. Different groups may be synchronized by the system (network) to maximize the overall system utility and performance and to prevent congestions.

Preregistration is a way that the system instates/instantiate the software states (access State, mobility managements state, and or session management states) for the MTC WTRUs to gain access to the system and to avoid the normal procedures over the air interface. This is done to accelerate access and reduce the number of messages over the air.

The M2M AF may preregister, IP activate, or both for an MTC group in a timely manner, such as at the beginning of each cycle. After the MTC WTRUs in a group complete data transfer and control updates, related IP addresses may be deactivated, for example, by the AF. In addition, the group may be deregistered, for example, by the AF. An MTC WTRU, such as a single registration MTC WTRU, may be updated via a common channel, such as a paging or broadcast message, using a group identification and an account number. For period registration, a control cycle may coincide with a report cycle, and updates may be performed when all members of the group are awake. The network may initiate, or trigger, an MTC WTRU to access the network and perform defined functions during a wake up cycle.

The M2M AF may preregister and IP activate an IP address for an MTC group and the network may communicate traffic channel information, such as data plan information, and IP addresses to the group for network access. During the reporting period, control signaling may be done using traffic channel signaling on top of IP. For example, signaling on top of IP may be utilized in the case when the system or network performs maintenance operations, or a software upgrade or downloading new information/configuration. These operations may be accomplished during the reporting period after or before the devices upload their data to the system or network. An attempt by a preregistered MTC WTRU to access the network using a group ID may be denied. An MTC WTRU may not perform registration independently.

Figure 5:
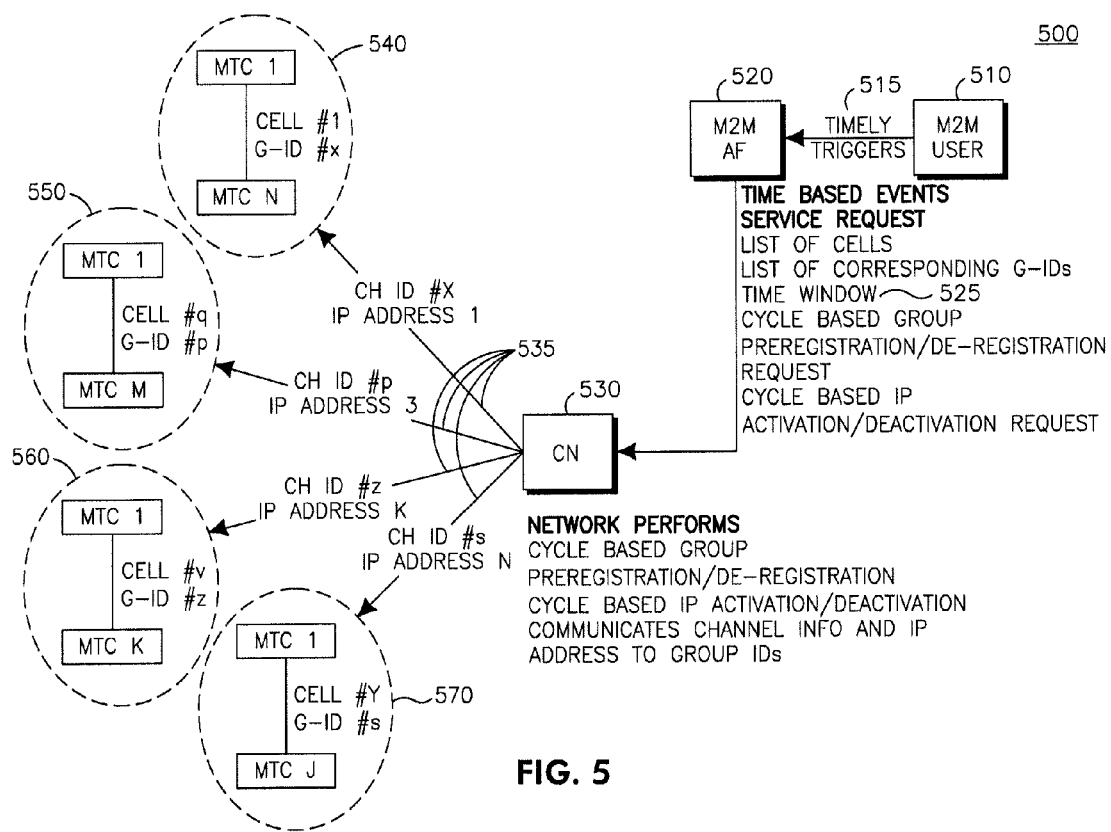
FIG. 5 shows a diagram of an example of a periodic preregistration cycle.

FIG. 5 is an example periodic preregistration cycle 500 for a group of MTC devices. In the periodic preregistration cycle, the MTC devices may receive cycle based preregistration/de-registration requests, cycle based IP activation/deactivation requests, channel information and IP addressing based on group IDs.

For illustration purposes, four MTC device groups are shown and may be denoted as MTC device group 540, MTC device group 550, MTC device group 560 and MTC device group 570. Each MTC device group may include multiple MTC devices. For example, MTC device group 540 may include MTC devices 1-N, MTC device group 550 may include MTC devices 1-M, MTC device group 560 may include MTC devices 1-K, and MTC device group 570 may include MTC devices 1-J. Each MTC device group may be associated with a cell identifier and a group identification (G-ID) number. For example, MTC device group 540 may be associated with cell #1 and G-ID #x, MTC device group 550 may be associated with cell #q and G-ID #p, MTC device group 560 may be associated with cell #v and G-ID #z, and MTC device group 570 may be associated with cell #Y and G-ID #s. FIG. 5 also shows a M2M user 510 that may be in communication with a M2M AF 520, which in turn may be in communication with a core network 530. MTC device groups 540, 550, 560 and 570 may be in communication with CN 530.

Operationally, the M2M user 510 may send a request to the M2M AF 520 to send information to a group of MTC devices (515). The request may be a periodic trigger, event based trigger, other like triggers or a combination thereof. In response to the M2M user 510, the M2M AF 520 may send a service request or trigger a time based event to the CN 530 (525). The service request or trigger may include the list of cells or corresponding G-IDs, cycle based preregistration/de-registration request, cycle based IP activation/deactivation request, and a time window. A time window may be defined as the time when the group wakes up. The CN 530 may then send a request for cycle based preregistration/de-registration, cycle based IP activation/deactivation and communicate channel information to the G-IDs (535). Channel information may comprise channel ID, dedicated or a shared channel, type of modulation, timings frame formats, etc. Although each cell is shown separately for simplicity, it should be apparent that cells may overlap. An MTC WTRU may be associated with one or more cells or groups. A cell may be associated with a channel ID and an IP address.

Figure 6:
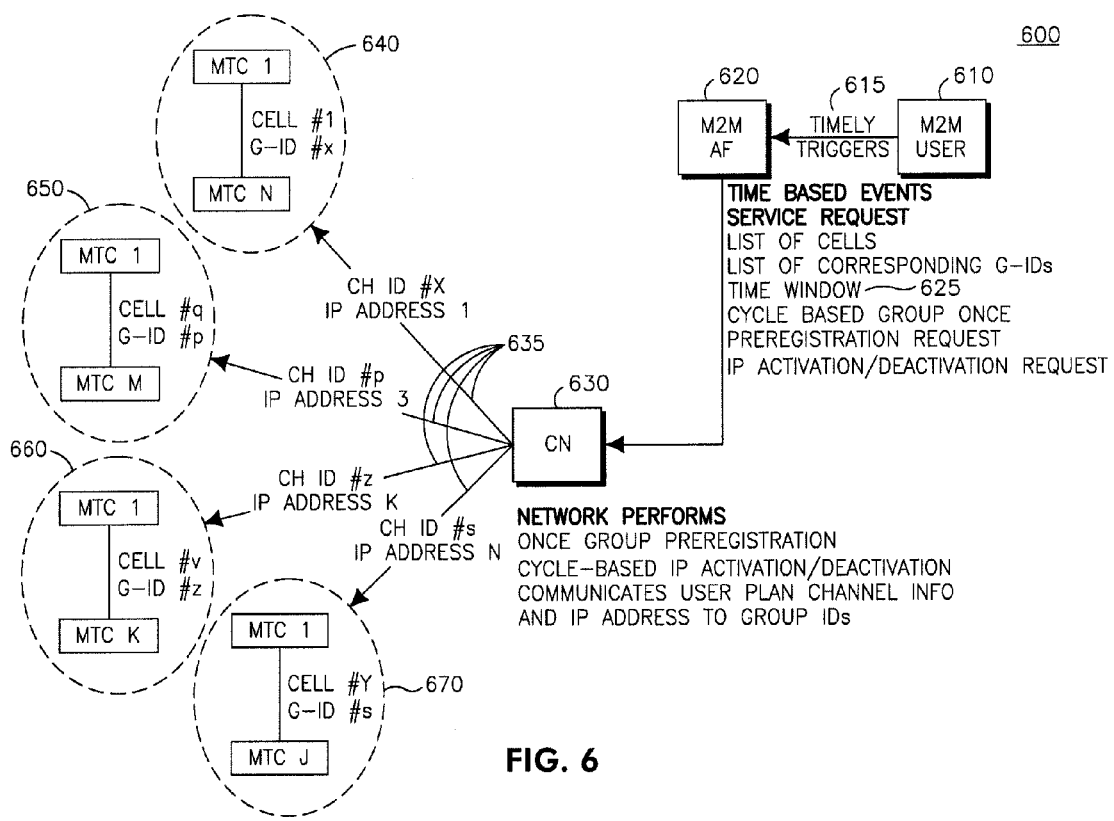
FIG. 6 shows a diagram of a single preregistration cycle.

FIG. 6 is an example single preregistration cycle 600 for a group of MTC devices. In the single preregistration cycle, the MTC devices may receive a once or initial group preregistration request, cycle based IP activation/deactivation requests and user plan channel information and IP addressing based on group IDs.

For illustration purposes, four MTC device groups are shown and may be denoted as MTC device group 640, MTC device group 650, MTC device group 660 and MTC device group 670. Each MTC device group may include multiple MTC devices. For example, MTC device group 640 may include MTC devices 1-N, MTC device group 650 may include MTC devices 1-M, MTC device group 660 may include MTC devices 1-K, and MTC device group 670 may include MTC devices 1-J. Each MTC device group may be associated with a cell identifier and a group identification (G-ID) number. For example, MTC device group 640 may be associated with cell #1 and G-ID #x, MTC device group 650 may be associated with cell #q and G-ID #p, MTC device group 660 may be associated with cell #v and G-ID #z, and MTC device group 670 may be associated with cell #Y and G-ID #s. FIG. 6 also shows a M2M user 610 that may be in communication with a M2M AF 620, which in turn may be in communication with a core network 630. MTC device groups 640, 650, 660 and 670 may be in communication with CN 630.

Operationally, the M2M user 610 may send a request to the M2M AF 620 to send information to a group of MTC devices (615). The request may be a periodic trigger, event based trigger, other like triggers or a combination thereof. In response to the M2M user 610, the M2M AF 620 may send a service request or trigger a time based event to the CN 630 (625). The service request or trigger may include the list of cells or corresponding G-IDs, an initial or one preregistration request, an IP activation/deactivation request, and a time window. The CN 630 may then send a request for an initial or one group preregistration request, cycle based IP activation/deactivation requests and communicate user plan channel information and IP addressing to G-IDs (635). Channel information may comprise channel ID, dedicated or a shared channel, type of modulation, timings frame formats, etc. Although each cell is shown separately for simplicity, it should be apparent that cells may overlap. An MTC WTRU may be associated with one or more cells or groups. A cell may be associated with a channel ID and an IP address.

Figure 7:
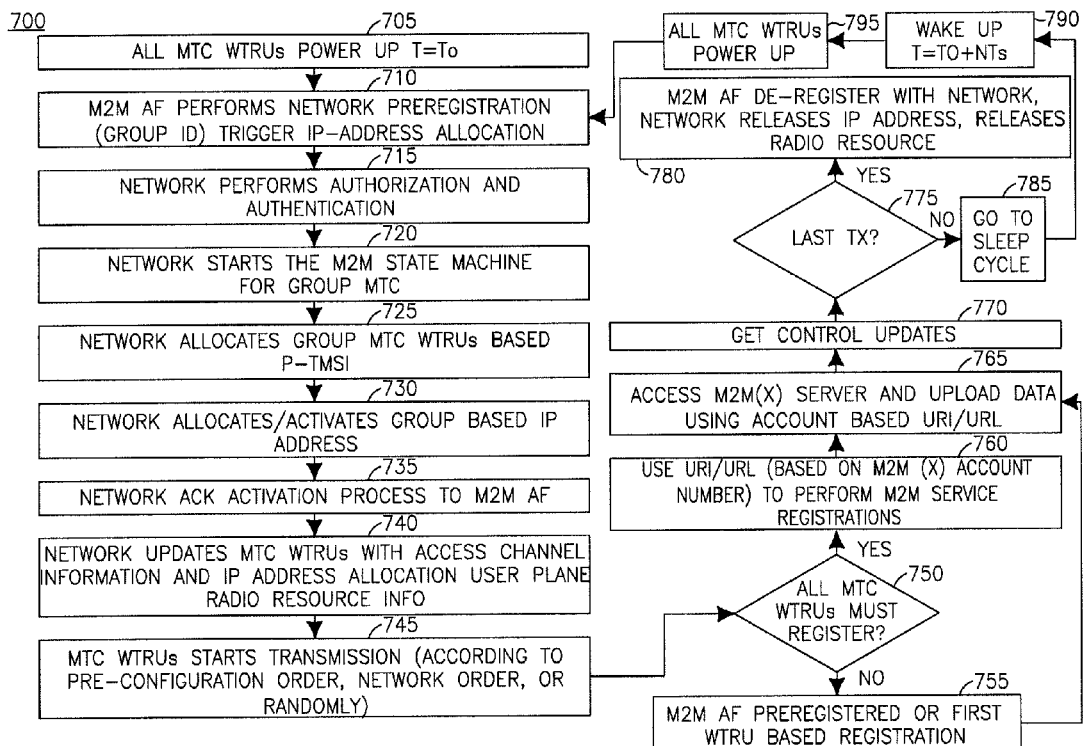
FIG. 7 shows a diagram of an example of a method of network controlled periodic machine to machine application function preregistration and Internet Protocol (IP) allocation.

FIG. 7 shows an example flowchart 700 for network controlled periodic M2M AF preregistration and IP allocation. In this method, an M2M application function (AF) may perform preregistration, de-registration, Internet Protocol (IP) activation, IP de-activation, on behalf of an MTC WTRU in the network. Proximal MTC WTRUs, such as MTC WTRUs in cell or geographic area, may use group based identification, such as International Mobile Subscriber Identity (IMSI) or Packet-Temporary Mobile Subscriber Identity (P-TMSI), for network access. In addition, a wake up cycle for an AF and an MTC WTRU may be synchronized, for example, where the AF and the MTC WTRU are associated with different groups. The WTRUs in the same group may be synchronized to wake up at certain times. Different groups may be synchronized by the system (network) to maximize the overall system utility and performance, and to prevent congestion.

The M2M AF may preregister, IP activate, or both for an MTC group in a timely manner, such as at the beginning of each cycle. The network may communicate traffic channel information, such as data plan information, and IP addresses to the group for network access. After the MTC WTRUs in a group complete data transfer and control updates, related IP addresses may be deactivated, for example, by the AF. In addition, the group may be deregistered, for example, by the AF. An MTC WTRU, such as a single registration MTC WTRU, may be updated via a common channel, such as a paging or broadcast message, using a group identification and an account number.

Network controlled periodic M2M AF preregistration and IP allocation process may begin once all MTC WTRUs are powered up (705). Registration is done periodically based upon a wake up/all MTC WTRUs power-up (790, 795). The M2M AF may perform preregistration using the group ID, and may trigger IP address allocation (710). The network may perform authorization and authentication (715), start an M2M state machine for an MTC group (720), allocate an MTC WTRUs group based P-TMSI (725), allocate or activate MTC WTRUs group based IP addresses (730), send an acknowledgment (ACK) to indicate the activation process to the M2M AF (735) and update the MTC WTRUs with access channel information, IP address allocation and user plane radio resource information (740).

The MTC WTRUs may start transmission. Transmission may be started based on a preconfigured order, a network defined order, or randomly (745). The M2M operator may require all MTC WTRUs to register with the M2M server (750). If all MTC WTRUs may need to register, then each MTC WTRU may use uniform resource identifier/uniform resource location (URI)/(URL) to perform service registrations (760). The URI/URL may be based on an M2M account number or any other identifier such as a telephone number, extension, MSISDN, and the like. The MTC WTRU may access the M2M(x) server and upload data using an account based URI/URL (765). If all MTC WTRUs do not need to register, then the M2M AF may perform preregistration or the first (master or alpha) WTRU may perform registration (755). Once completed, all the following MTC WTRUs may access the M2M(x) server and upload data using an account based URI/URL (765). The MTC WTRUs may then get control updates (770). If the last transmission is complete (775) the M2M AF may deregister with the network, and the network may release the IP addresses, and radio resources (780). The MTC WTRUs may then begin a sleep cycle (785). Otherwise, if this is not the last transmission, the MTC WTRUs may begin a sleep cycle (785).

The MTC WTRUs may wake up at the end of the sleep cycle, and may restart the method. The sleep cycle may be followed by a wake up cycle (790), after which the periodic AF M2M preregistration and IP allocation process starts again. The wake up cycle may be scheduled by the network, randomly by the MTC devices, pre-configured and combinations thereof.

Figure 8A:
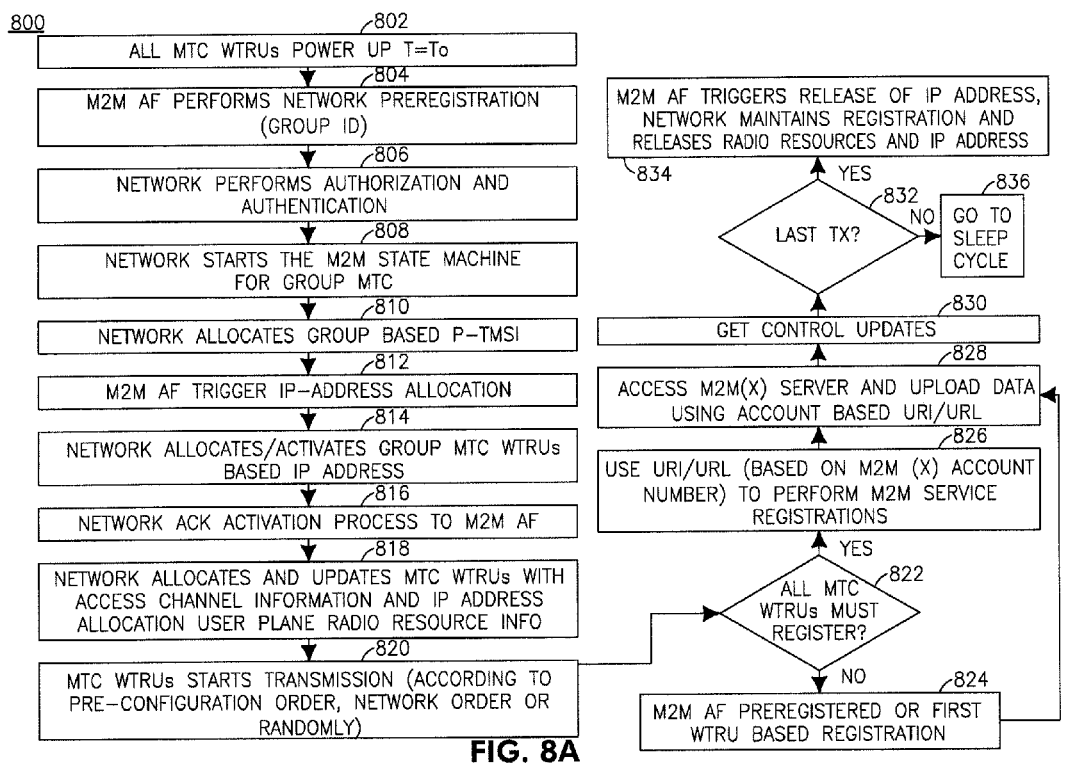
FIG. 8A and FIG. 8B shows a diagram of an example of a method of network controlled single machine to machine application function preregistration and periodic IP allocation; and FIG. 9A
Figure 8B:
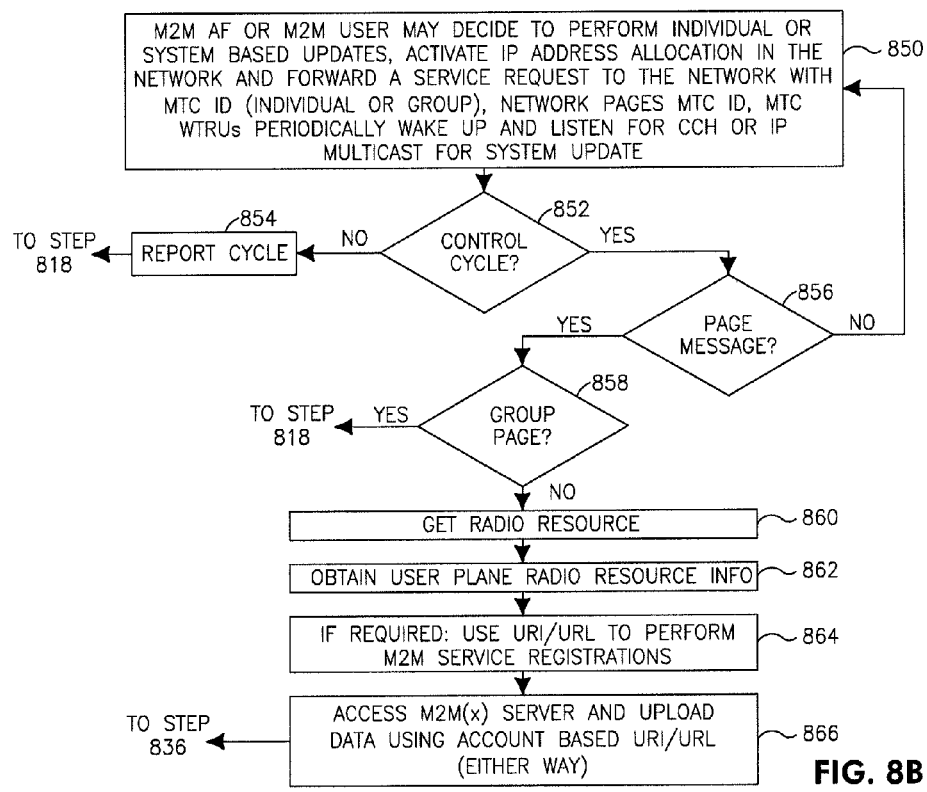

FIGS. 8A and 8B shows an example flowchart 800 for network controlled single M2M AF preregistration and periodic IP allocation. In this method, an M2M application function (AF) may perform preregistration, de-registration, Internet Protocol (IP) activation, and/or IP de-activation on behalf of an MTC WTRU in the network. Proximal MTC WTRUs, such as MTC WTRUs in cell or geographic area, may use group based identification, such as International Mobile Subscriber Identity (IMSI) or Packet-Temporary Mobile Subscriber Identity (P-TMSI), for network access. In addition, a wake up cycle for an AF and an MTC WTRU may be synchronized, for example, where the AF and the MTC WTRU are associated with different groups. The WTRUs in the same group may be synchronized to wake up at certain times. Different groups may be synchronized by the system (network) to maximize the overall system utility and performance and to prevent congestions.

The M2M AF may preregister, IP activate, or both for an MTC group in a timely manner, such as at the beginning of each cycle. The network may communicate traffic channel information, such as data plan information, and IP addresses to the group for network access. After the MTC WTRUs in a group complete data transfer and control updates, related IP addresses may be deactivated, for example, by the AF. In addition, the group may be deregistered, for example, by the AF. An MTC WTRU, such as a single registration MTC WTRU, may be updated via a common channel, such as a paging or broadcast message, using a group identification and an account number.

Network controlled single M2M AF preregistration and periodic IP allocation process may begin once all MTC WTRUs are powered up (802). The M2M AF may perform preregistration using the group ID (804). The network may perform authorization and authentication (806), start an M2M state machine for an MTC group (808) and allocate a group based P-TMSI (810).

The M2M AF may trigger IP address allocation (812). The network may allocate or activate group based IP addresses (814), send an acknowledgment (ACK) to indicate the activation process to the M2M AF (816), allocate and update the MTC WTRUs with access channel information, and IP address allocation. The update may include user plane radio resource information (818).

The MTC WTRUs may start transmission. Transmission may be started based on a preconfigured order, a network defined order, or randomly (820). The M2M operator may require all MTC WTRUs to register with the M2M server (822). If all MTC WTRUs may need to register, then each MTC WTRU may use uniform resource identifier/uniform resource location (URI)/(URL) to perform service registrations (826). The URI/URL may be based on an M2M account number or any other identifier such as a telephone number, extension, MSISDN and the like. The MTC WTRU may access the M2M(x) server and upload data using an account based URI/URL (828). If all MTC WTRUs do not need to register, then the M2M AF may perform preregistration or the first (master or alpha) WTRU may perform registration (824). Once completed, all the following MTC WTRUs may access the M2M(x) server and upload data using an account based URI/URL (828). The MTC WTRUs may then get control updates (830). If the last transmission is complete (832) the M2M AF may trigger release of IP address, the network may maintain registration, and release radio resources and IP address (834). The MTC WTRUs may then begin a sleep cycle (836). Otherwise, if this is not the last transmission (832), the MTC WTRUs may begin a sleep cycle (836).

The sleep cycle (836) may then be followed by a M2M AF or M2M user deciding to perform individual or system based updates, activate IP address allocation in the network and forwarding a service request with the MTC ID, such as an individual ID or a group ID. The network may send a page with an MTC ID. Also, an MTC WTRU may wake up from a sleep cycle and listen for system update information, for example, on a control channel (CCH) or an IP multicast (850). The wake up cycle may be scheduled by the network, randomly by the MTC devices, pre-configured and combinations thereof.

In response to a determination that the MTC WTRU is in a control cycle (852), the MTC may determine if it has received a paging message (856). If it has not received a paging message, it may continue to listen for a system update. If it has received a paging message, it may determine if the paging message is a group paging message (858). If the paging message is not a group paging message, the MTC WTRU may then proceed to obtain a radio resource (860).

After performing one or more actions to obtain a radio resource (860), the MTC WTRU may obtain user plane radio resource information (862). If required, the MTC WTRU may use URI/URL to perform service registrations (864). The URI/URL may be based on an M2M account number or any other identifier such as a telephone number, extension, MSISDN and the like. The MTC WTRU may access the M2M(x) server and upload data using an account based URI/URL (866). The MTC WTRUs may then begin a sleep cycle (836).

If the paging message is a group paging message, the registration method may be restarted based on the network allocating and updating the MTC WTRUs with access channel information, and IP address allocation. The update may include user plane radio resource information (818).

In response to a determination that the MTC WTRU is not in a control cycle, the MTC WTRU may perform a reporting cycle (854) and the registration method may be restarted based on the network allocating and updating the MTC WTRUs with access channel information, and IP address allocation. The update may include user plane radio resource information (818).

After the determinations of whether the group page message was sent and the MTC WTRU is not in a control cycle update the MTC WTRUs may start transmission. Transmission may be started based on a preconfigured order, a network defined order, or randomly (820). The M2M operator may require all MTC WTRUs to register with the M2M server (822). If all MTC WTRUs may need to register, then each MTC WTRU may use uniform resource identifier/uniform resource location (URI)/(URL) to perform service registrations (826). The MTC WTRU may access the M2M(x) server and upload data using an account based URI/URL (828). If all MTC WTRUs do not need to register, then the M2M AF may perform preregistration or the first (master or alpha) WTRU may perform registration (824). Once completed, all the following MTC WTRUs may access the M2M(x) server and upload data using an account based URI/URL (828). The MTC WTRUs may then get control updates (830). If the last transmission is complete the M2M AF trigger release of an IP address, the network maintains registration and may release radio resources and IP address (834). The MTC WTRUs may then begin a sleep cycle (836). Otherwise, if this is not the last transmission (832), the MTC WTRUs may begin a sleep cycle (836).

Figure 9A:
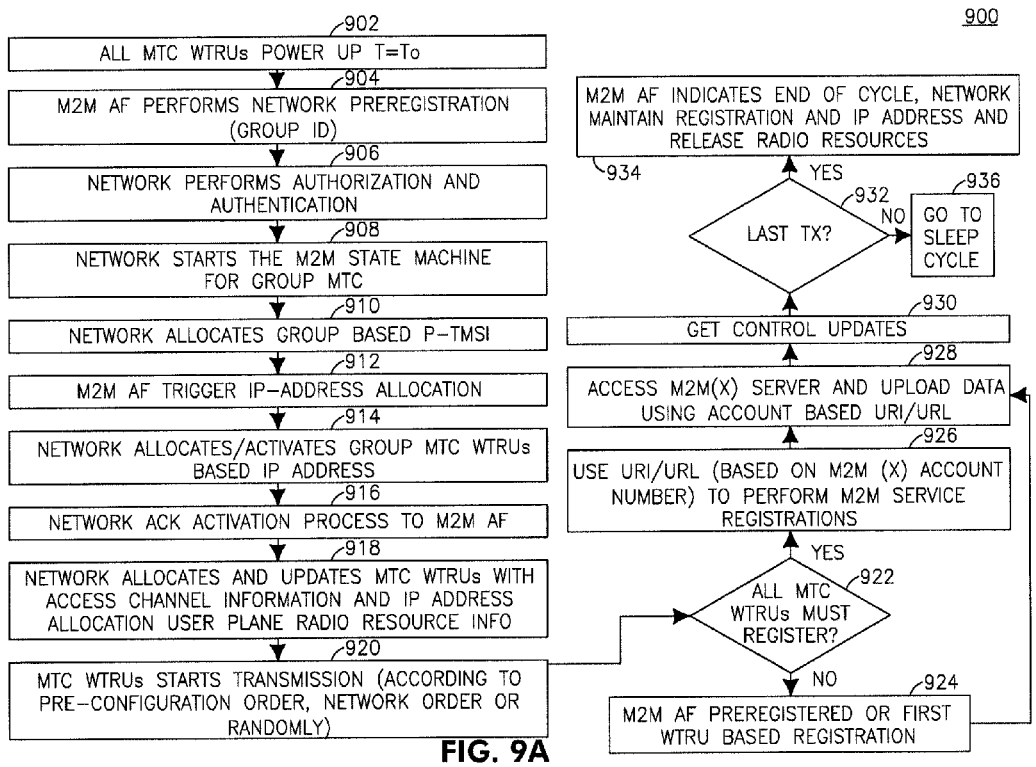
FIG. 9B shows a diagram of an example of a method of network controlled single machine to machine application function preregistration and IP allocation.
Figure 9B:
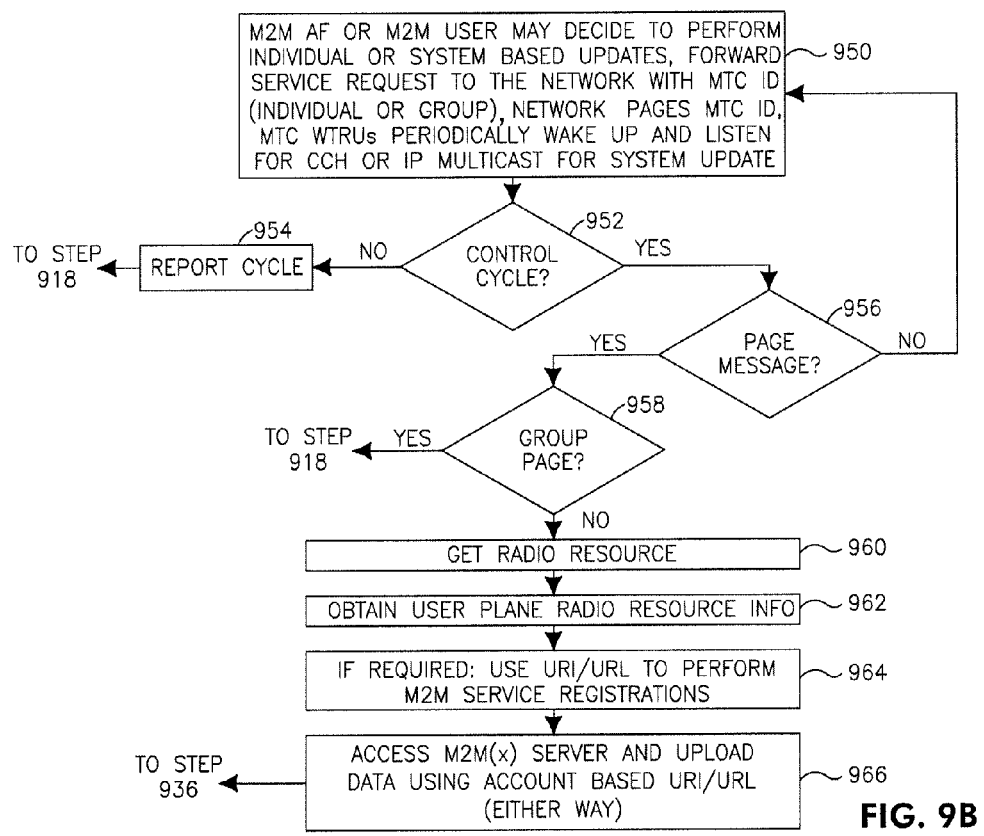

FIGS. 9A and 9B shows an example flowchart 900 for network controlled single M2M AF preregistration and IP allocation. In this method, an M2M application function (AF) may perform preregistration, de-registration, Internet Protocol (IP) activation, and/or IP de-activation on behalf of an MTC WTRU in the network. Proximal MTC WTRUs, such as MTC WTRUs in cell or geographic area, may use group based identification, such as International Mobile Subscriber Identity (IMSI) or Packet-Temporary Mobile Subscriber Identity (P-TMSI), for network access. In addition, a wake up cycle for an AF and an MTC WTRU may be synchronized, for example, where the AF and the MTC WTRU are associated with different groups. The WTRUs in the same group may be synchronized to wake up at certain times. Different groups may be synchronized by the system (network) to maximize the overall system utility and performance and to prevent congestions.

The M2M AF may preregister, IP activate, or both for an MTC group in a timely manner, such as at the beginning of each cycle. The network may communicate traffic channel information, such as data plan information, and IP addresses to the group for network access. After the MTC WTRUs in a group complete data transfer and control updates, related IP addresses may be deactivated, for example, by the AF. In addition, the group may be deregistered, for example, by the AF. An MTC WTRU, such as a single registration MTC WTRU, may be updated via a common channel, such as a paging or broadcast message, using a group identification and an account number.

Network controlled single M2M AF preregistration and IP allocation process may begin once all MTC WTRUs are powered up (902). The M2M AF may perform preregistration using the group ID (904). The network may perform authorization and authentication (906), start an M2M state machine for an MTC group (908) and allocate a group based P-TMSI (910).

The M2M AF may trigger IP address allocation (912). The network may allocate or activate group based IP addresses (914), send an acknowledgment (ACK) to indicate the activation process to the M2M AF (916), allocate and update the MTC WTRUs with access channel information, and IP address allocation. The update may include user plane radio resource information (918).

The MTC WTRUs may start transmission. Transmission may be started based on a preconfigured order, a network defined order, or randomly (920). The M2M operator may require all MTC WTRUs to register with the M2M server (922). If all MTC WTRUs may need to register, then each MTC WTRU may use uniform resource identifier/uniform resource location (URI)/(URL) to perform service registrations (926). The URI/URL may be based on an M2M account number or any other identifier such as a telephone number, extension, MSISDN and the like. The MTC WTRU may access the M2M(x) server and upload data using an account based URI/URL (928). If all MTC WTRUs do not need to register, then the M2M AF may perform preregistration or the first (master or alpha) WTRU may perform registration (924). Once completed, all the following MTC WTRUs may access the M2M(x) server and upload data using an account based URI/URL (928). The MTC WTRUs may then get control updates (930). If the last transmission is complete (932) the M2M AF may indicate end of cycle, and the network may maintain registration and IP addresses, and release radio resources (934). The MTC WTRUs may then begin a sleep cycle (936). Otherwise, if this is not the last transmission (932), the MTC WTRUs may begin a sleep cycle (936).

The sleep cycle (936) may then be followed by a M2M AF or M2M user deciding to perform individual or system based updates, forward a service request to the network with the MTC ID, such as an individual ID or a group ID. Also, an MTC WTRU may wake up from a sleep cycle and listen for system update information, for example, on a control channel (CCH) or an IP multicast (950). The wake up cycle may be scheduled by the network, randomly by the MTC devices, pre-configured and combinations thereof.

In response to a determination that the MTC WTRU is in a control cycle (952), the MTC may determine if it has received a paging message (956). If it has not received a paging message, it may continue to listen for a system update. If it has received a paging message, it may determine if the paging message is a group paging message (958). If the paging message is not a group paging message, the MTC WTRU may then proceed to obtain a radio resource (960).

After performing one or more actions to obtain a radio resource (960), the MTC WTRU may obtain user plane radio resource information (962). If required, the MTC WTRU may use URI/URL to perform service registrations (964). The URI/URL may be based on an M2M account number or any other identifier such as a telephone number, extension, MSISDN and the like. The MTC WTRU may access the M2M(x) server and upload data using an account based URI/URL (966). The MTC WTRUs may then begin a sleep cycle (936).

If the paging message is a group paging message, the registration method may be restarted based on the network allocating and updating the MTC WTRUs with access channel information, and IP address allocation. The update may include user plane radio resource information (918).

In response to a determination that the MTC WTRU is not in a control cycle, the MTC WTRU may perform a reporting cycle (854) and the registration method may be restarted based on the network allocating and updating the MTC WTRUs with access channel information, and IP address allocation. The update may include user plane radio resource information (918).

After the determinations of whether the group page message was sent and MTC WTRU is not in a control cycle update the MTC WTRUs may start transmission. Transmission may be started based on a preconfigured order, a network defined order, or randomly (920). The M2M operator may require all MTC WTRUs to register with the M2M server (922). If all MTC WTRUs may need to register, then each MTC WTRU may use uniform resource identifier/uniform resource location (URI)/(URL) to perform service registrations (926). The URI/URL may be based on a M2M account number. The MTC WTRU may access the M2M(x) server and upload data using an account based URI/URL (928). If all MTC WTRUs do not need to register, then the M2M AF may perform preregistration or the first (master or alpha) WTRU may perform registration (924). Once completed, all the following MTC WTRUs may access the M2M(x) server and upload data using an account based URI/URL (928). The MTC WTRUs may then get control updates (930). If the last transmission is complete (932) the M2M AF may deregister with the network, and the network may release the IP addresses, and radio resources (934). The MTC WTRUs may then begin a sleep cycle (936). Otherwise, if this is not the last transmission (832), the MTC WTRUs may begin a sleep cycle (936).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method for using a machine to machine (M2M) application that is for interfacing with a wireless communication network comprising a plurality of wireless/transmit receive units (WTRUs) that are organized into one or more groups by one of a group identifier or a cell identification, the method comprising:
receiving in the M2M application a request to initiate a machine type communication (MTC) preregistration for two or more wireless transmit/receive units (WTRUs) in the one or more groups of WTRUs that enables the two or more WRTUs to obtain radio resources;
transmitting a service request from the M2M application to the wireless communications network to perform the MTC preregistration for the two or more WRTUs in the one or more groups of WTRUs, that comprises (i) one of the cell identification or the group identification for the two or more WTRUs; (ii) a cycle based IP activation/deactivation request; and (iii) a time window defining when the two or more WTRUs awakes to communicate with the wireless communications network; and receiving an acknowledgement, in an application function of the M2M application, from the network indicating the completion of MTC preregistration for the two or more WTRUs in the one or more groups of WTRUs.

2. The method of claim 1, wherein the service request is transmitted periodically.

3. The method of claim 1, wherein the MTC preregistration enables the two or more WTRUs to use an account-based uniform resource identifier/uniform resource location (URI)/(URL) to upload data to a M2M server.

4. The method of claim 1, further comprising: the M2M application receiving a trigger to initiate the MTC deregistration with the network for the two or more WTRUs, wherein the trigger includes receiving a signal from one of the two or more WTRUs.

5. The method of claim 1, further comprising: receiving a trigger at the M2M application to release an IP address and release radio resources for the two or more WTRUs, wherein the trigger includes receiving a signal from one of the two or more WTRUs.

6. The method of claim 1, further comprising: receiving a trigger to initiate a reporting cycle for the two or more WTRUs; and performing a reporting cycle.

7. The method of claim 1, further comprising: receiving a trigger to initiate a cycle control cycle for the two or more WTRUs; and performing a control cycle.

8. A machine to machine (M2M) application function (AF) apparatus, for interfacing with a wireless communications network comprising a server and a plurality of wireless/transmit receive unites (WTRUs) that are organized into one or more groups by one of a group identification or a cell identification, comprising:

a processor configured with executable instructions to
(i) receive a request to initiate a machine type communication (MTC) preregistration for two or more wireless transmit/receive units (WTRUs);
(ii) generate a service request to transmit to the network to perform the MTC preregistration for the two or more WTRUs in the one or more groups of WTRUs; that comprises (1) one of a cell identification or a group identification for the two or more WTRUs; (2) a cycle based IP activation/deactivation request; and (3) a time window defining when the two or more WTRUs awakes to communicate with the wireless communications network; and
(iii) receive an acknowledgement from the network indicating the completion of MTC preregistration for the two or more WTRUs in the one or more groups of WTRUs, wherein MTC preregistration enables the two or more WTRUs to obtain radio resources.

9. The M2M AF apparatus of claim 8, wherein the processor contains executable instructions for transmitting the service request to the network periodically.

10. The M2M AF apparatus of claim 8, wherein the MTC preregistration enables the two or more WTRUs in the group of WTRUs to use an account based uniform resource identifier/uniform resource location (URI)/(URL) to upload data to a M2M server.

11. The M2M apparatus of claim 8, wherein the processor is further configured to receive a trigger to initiate an MTC deregistration with the network for the two or more WTRUs in the group of WTRUs, wherein the trigger includes the reception of a signal from one of the plurality of WTRUs.

12. The M2M AF of claim 8, wherein the processor is further configured to receive a trigger to release an IP address and release radio resources for the two or more WTRUs, wherein the trigger includes the reception of a signal from one of the plurality of WTRUs.

13. The M2M AF of claim 8, wherein the processor is further configured to receive a trigger to initiate a reporting cycle for the two or more WTRUs; and to perform a reporting cycle.

14. The M2M AF of claim 8, wherein the processor is further configured to receive a trigger to initiate a control cycle for the two or more WTRUs; and to perform a control cycle.

* * * * *